Patented Sept. 20, 1927.

1,642,789

UNITED STATES PATENT OFFICE.

JOHN W. SALE AND JOHN B. WILSON, OF WASHINGTON, DISTRICT OF COLUMBIA, ASSIGNORS TO THE GOVERNMENT AND THE PEOPLE OF THE UNITED STATES OF AMERICA.

PROCESS FOR MANUFACTURING A TRUE MAPLE FLAVORING PRODUCT.

No Drawing.  Application filed April 1, 1927. Serial No. 180,329.

(GRANTED UNDER THE ACT OF MARCH 3, 1883; 22 STAT. L. 625.)

This application is made under the act of March 3, 1883, Chapter 143 (22 Stat. 625) and the invention herein described and claimed may be used by the Government or the United States or any of its officers or employees in the prosecution of work for the Government, or by any citizen of the United States, without payment to us of any royalty thereon.

Our invention relates to a process for the manufacture of a true maple flavoring product of high concentration, which when mixed with sugar (sucrose) sirup of proper density, will make an article essentially similar to commercial maple sirup.

No one has hitherto succeeded in preparing genuine maple flavor, the most highly concentrated maple product known being maple sugar which represents a maximum concentration of maple sirup of about 1.3 parts maple sirup to 1 part maple sugar. By our process the flavor in ordinary maple sirup can be so concentrated that all or nearly all of the flavor in 40 parts or more or less of maple sirup will be contained in 1 part of the concentrated maple flavoring product. The concentrated maple flavor can be manufactured from maple sap, partially concentrated maple sap, maple sirup, maple sugar, or a combination of any two or more of these maple products. We have found it to be desirable that the product which is selected should have a relatively low content of invert sugar. The keeping qualities of our product are greatly enhanced, due to the fact that the sugar is to a large extent removed, the sugar being a highly fermentable substance.

After selecting a suitable maple product, proceed as follows:

Bring the maple product to a suitable density which we have found to be about 28° B. This may be accomplished by concentrating or by the addition of maple sirup or maple sugar if the maple product is lighter than 28° B or by the addition of water or maple sap or partially concenterated maple sap if the maple product is heavier than 28° B. Heat the maple sugar solution thus obtained to 175° to 180° F which range of temperature we have found to be the most desirable for the production of a maximum quantity of precipitate and also for the production of a most readily filterable precipitate, when the precipitant is added thereto. Prepare a solution of the precipitant by mixing a quantity of barium hydroxide $(Ba(OH)_2 + 8H_2O)$ equal in weight to that of the sugar in the maple sugar solution, with an equal weight of water and heating to 175° to 180° F. A solution of this strength will give an excess of about 10 per cent of barium over that needed to combine with the sugar, which strength we have found to produce the most desirable precipitate. We have found that by this procedure 95% or more of the sugar will be removed. While larger proportions of the barium reagent will remove more sugar, the disadvantages of adding larger quantities of precipitant appear to outweigh the advantages. Smaller quantities of precipitant can be employed but less sugar will be removed and the flavoring strength of the finished product will be correspondingly less. The precipitation with barium hydrate may be repeated but a single precipitation will accomplish the object sought to be attained by our process, it having been found that no particular advantage is obtained by a second precipitation. Add the hot solution of the precipitant to the hot maple sugar solution and stir, without further heating, until there is no further formation of the heavy voluminous precipitate. This operation will require only a few minutes. While the resulting mixture is still hot, filter it by means of a filter press or any other suitable filtering device. The press cake may be either discarded or reserved for the recovery of the sugar contained in it.

To the hot filtrate, add while stirring, pure sulphuric acid solution having a density of about 40° B. in slight excess of that necessary to combine with the barium present. While it is essential that the solution be distinctly acid at this point, care should be taken to avoid an excess of acid. We have obtained excellent results by adding such a quantity of sulphuric acid as is necessary to combine with the barium present and by then adding an excess of sulphate ion in the form of a separate solution of calcium sulphate. By proceeding in this way, the subsequent neutralization of excess acid becomes unnecessary. Let the mixture stand several hours and filter off the precipitated barium sulphate by means of a filter press or other suitable filtering device. Discard the press cake. Concentrate the filtrate, preferably in vacuo to about one tenth of its volume. Add while stirring, powdered calcium carbonate in small portions, until the solution is neutral or just acid to litmus. The mixture should not be alkaline. Filter the mixture by means of filter press or other suitable filtering device. Discard the press cake and concentrate the filtrate in vacuo to a suitable density which we have found to be about 34° B. The resulting product is a concentrated true maple flavoring product and may be employed in manufacturing reconstituted maple sirup by adding it in suitable proportions to 1 gallon of sugar sirup having a density of about 36° B. The reconstituted maple sirup will possess all of the delightful aroma and flavor of maple sirup.

We claim:

A process for the manufacture of a highly concentrated true maple flavoring product comprising the adjustment of a maple product to a density of about 28° B, heating the same, removing substantially all of the sugar present therein by precipitation, and finally concentrating.

JOHN W. SALE.
JOHN B. WILSON.